US009954947B2

(12) United States Patent
Bennett, Jr. et al.

(10) Patent No.: US 9,954,947 B2
(45) Date of Patent: Apr. 24, 2018

(54) RESOURCE FENCING FOR VLAN MULTI-TENANT SYSTEMS

(71) Applicant: Hitachi Data Systems Corporation, Santa Clara, CA (US)

(72) Inventors: Charles C. Bennett, Jr., Carlisle, MA (US); Clayton Alan Curry, Framingham, MA (US); Sowmya Manjanatha, Westford, MA (US)

(73) Assignee: Hitachi Vantara Corporation, Santa Clara, CA (US)

( * ) Notice: Subject to any disclaimer, the term of this patent is extended or adjusted under 35 U.S.C. 154(b) by 4 days.

(21) Appl. No.: 14/438,912

(22) PCT Filed: Feb. 27, 2013

(86) PCT No.: PCT/US2013/027867
§ 371 (c)(1),
(2) Date: Apr. 28, 2015

(87) PCT Pub. No.: WO2014/133496
PCT Pub. Date: Sep. 4, 2014

(65) Prior Publication Data
US 2015/0296016 A1    Oct. 15, 2015

(51) Int. Cl.
*G06F 15/16*    (2006.01)
*H04L 29/08*    (2006.01)
*H04L 29/06*    (2006.01)
*H04L 29/12*    (2006.01)

(52) U.S. Cl.
CPC ...... *H04L 67/1097* (2013.01); *H04L 61/2007* (2013.01); *H04L 63/104* (2013.01); *H04L 67/1095* (2013.01)

(58) Field of Classification Search
CPC ..... H04L 67/1097; H04L 63/08; G06F 15/16; G06F 3/067; G06F 3/0653
USPC .......................... 709/213, 245; 370/328, 409
See application file for complete search history.

(56) References Cited

U.S. PATENT DOCUMENTS

| 6,748,448 | B1* | 6/2004 | Barrera | G06F 17/30887 707/E17.115 |
| 6,882,653 | B1* | 4/2005 | Kiuchi | H04L 41/0663 370/217 |
| 8,156,163 | B1* | 4/2012 | Hamilton | H04L 67/1097 707/812 |
| 8,209,738 | B2* | 6/2012 | Nicol | H04L 41/142 709/224 |

(Continued)

*Primary Examiner* — Tesfay Yohannes
(74) *Attorney, Agent, or Firm* — Mattingly & Malur, PC

(57) ABSTRACT

A storage system has a plurality of nodes which are grouped into a plurality of cluster systems each having multiple nodes, each cluster system being logically partitioned into a plurality of namespaces, each namespace including a collection of data objects, each cluster system having multiple tenants, each tenant being a grouping of namespaces, each cluster system having a plurality of capabilities, at least some of the capabilities being bound to the tenants. A node in the cluster system comprises: a memory, and a controller operable to bind each capability to one of a plurality of IP networks so that each capability is bound to only one of the IP networks and has a destination IP address of the IP network to which the capability is bound. It is permissible for one or more capabilities to be bound to the same IP network. Each IP network has one corresponding network interface.

9 Claims, 15 Drawing Sheets

(56) References Cited

U.S. PATENT DOCUMENTS

| | | | |
|---|---|---|---|
| 8,306,994 B2 * | 11/2012 | Kenworthy | H04L 63/0209 707/769 |
| 8,848,608 B1 * | 9/2014 | Addepalli | H04W 4/046 370/328 |
| 2001/0049825 A1 * | 12/2001 | Hirose | H04L 29/12018 725/111 |
| 2003/0161338 A1 * | 8/2003 | Ng | H04L 45/00 370/437 |
| 2005/0144475 A1 * | 6/2005 | Sakaki | G06F 21/55 726/26 |
| 2008/0025331 A1 * | 1/2008 | Tabata | H04L 12/4633 370/409 |
| 2008/0170566 A1 * | 7/2008 | Akimoto | H04L 61/2015 370/389 |
| 2008/0225755 A1 | 9/2008 | Ishizaki | |
| 2011/0106802 A1 | 5/2011 | Pinkney et al. | |
| 2012/0221608 A1 | 8/2012 | An et al. | |
| 2013/0083725 A1 * | 4/2013 | Mallya | H04L 63/20 370/328 |

\* cited by examiner

RESOURCE FENCING FOR VLAN MULTI-TENANT SYSTEMS

BACKGROUND OF THE INVENTION

The present invention relates generally to storage systems and, more particularly, to resource fencing or extended access security for multi-tenant data system.

In a multi-tenant data system, multiple networks are added to the system to allow each tenant to be accessed over a private network. Private network access is provided to allow the segregation of system administrative access from tenants, the segregation of tenants from each other, and the segregation of administrative from user access within a tenant. Further, data replication traffic can be placed on a private network.

In such a system, the management and data access interfaces for the system and its tenants must have a method to guarantee that any management or data resource accessed in the system is being accessed over the appropriate network. Further, if such a multi-tenant, multi-homed data system is to have a replica, and such a replica must be used for failover in the event of the failure of the primary system or site, such a replica would have inaccessible tenants if the replica site did not exactly mirror the network topology of the primary site.

BRIEF SUMMARY OF THE INVENTION

Exemplary embodiments of the invention provide mechanisms for maintaining the data access restrictions in the event of failover to a site with a substantially different network topology. In specific embodiments, a multi-tenant data system (MTDS) resides on multiple physical (802.1) and virtual (802.1q) LAN segments to provide the tenants of the data system with multiple private IP (Internet Protocol) networks. Managers of the MTDS can then bind one or more types of access to each of the private networks. These types of access include but are not limited to: System Management Access, Tenant Management Access and per-Tenant Data (end-user) Access. The MTDS is then able to use the destination network IP address within the multi-homed data system to limit the operations that can be performed by a user connecting to the system. Rather than firewall-based packet rejection, application-appropriate access restriction techniques are used.

Such a multi-homed data system necessarily operates within a network topology: the configuration of physical and virtual LANs in which it operates as well as the allocation of IP networks (subnets) to these LANs. At any specific site, the private IP networks and the access restrictions they enable are constrained by this topology.

Where the multi-homed MTDS is a backup or replica at a remote site, embodiments of the invention also allow for mapping the access restrictions enabled by the private IP networks on the primary site onto the LAN topology and private IP networks available at the replica site, even if this differs substantially from the topology of the primary site. The managers of the primary and replica systems are given capabilities that allow flexible decisions about how to best maintain access enforcement should failover use of the replica be required where the replica site is provisioned with a sparser network topology.

An aspect of the present invention is directed to a storage system having a plurality of nodes, the nodes being grouped into a plurality of cluster systems each having multiple nodes, each cluster system being logically partitioned into a plurality of namespaces, each namespace including a collection of data objects, each cluster system having multiple tenants, each tenant being a grouping of namespaces, each cluster system having a plurality of capabilities, at least some of the capabilities being bound to the tenants. A node in the cluster system comprises: a memory, and a controller operable to bind each capability to one of a plurality of IP networks so that each capability is bound to only one of the IP networks and has a destination IP address of the IP network to which the capability is bound. It is permissible for one or more capabilities to be bound to the same IP network. Each IP network has one corresponding network interface.

In some embodiments, each capability is a resource that is bound to one of (i) the cluster system or (ii) a replication interface of the cluster system or (iii) one of the tenants of the cluster system. The IP networks include a plurality of physical and virtual LAN segments. The capabilities comprise one or more of: management resource of the cluster system; data resource of the cluster system; replication resource; management resources of the tenants; or data resources of the tenants.

In specific embodiments, the controller is operable, in response to a request for a capability received via the corresponding network interface of one of the IP networks, to: find an IP network which is bound to the capability being requested by the request and determine whether an IP address of the IP network at which the request is received is in an address range allocated to the found IP network; if the IP address of the IP network at which the request is received is in an address range allocated to the found IP network, grant access by the request to the requested capability; and if the IP address of the IP network at which the request is received is not in an address range allocated to the found IP network, deny access by the request to the requested capability.

In some embodiments, the controller is operable, in response to a request for a capability received via the corresponding network interface of one of the IP networks, to: determine whether the capability being requested by the request is bound to a tenant and, if yes, find an IP network which is bound to the capability being requested by the request and determine whether the found IP network has an IP network alias entry; if it is determined that the found IP network does not have an IP network alias entry, determine whether an IP address of the IP network at which the request is received is in an address range allocated to the found IP network and, if yes, grant access by the request to the requested capability and, if no, deny access by the request to the requested capability; and if it is determined that the found IP network has an alias entry, look up an alias IP network based on the IP network alias entry, and determine whether an IP address of the IP network at which the request is received is in an address range allocated to the alias IP network and, if yes, grant access by the request to the requested capability and, if no, deny access by the request to the requested capability.

Another aspect of the invention is directed to a method for managing access to capabilities, in a storage system having a plurality of independent nodes, the nodes being grouped into a plurality of cluster systems each having multiple nodes, each cluster system being logically partitioned into a plurality of namespaces, each namespace including a collection of data objects, each cluster system having multiple tenants, each tenant being a grouping of namespaces, each cluster system having a plurality of capabilities, at least some of the capabilities being bound to the tenants, a node in the cluster system including a memory and a controller. The method comprises binding each capability to one of a plurality of IP networks so that each capability is bound to only one of the IP networks and have a destination IP address of the IP network to which the capability is bound. It is permissible for one or more capabilities to be bound to the same IP network. Each IP network has one corresponding network interface.

In some embodiments, the method further comprises, for a capability which is bound to a tenant which has no dedicated network resources and is inaccessible, finding an IP network which is bound to the capability and assigning an IP network alias entry of an alias IP network to the found IP network so as to map the capability via the IP network alias entry to the alias IP network. The alias IP network provides network access to the capability which is bound to the tenant.

These and other features and advantages of the present invention will become apparent to those of ordinary skill in the art in view of the following detailed description of the specific embodiments.

DETAILED DESCRIPTION OF THE INVENTION

Figure 1:
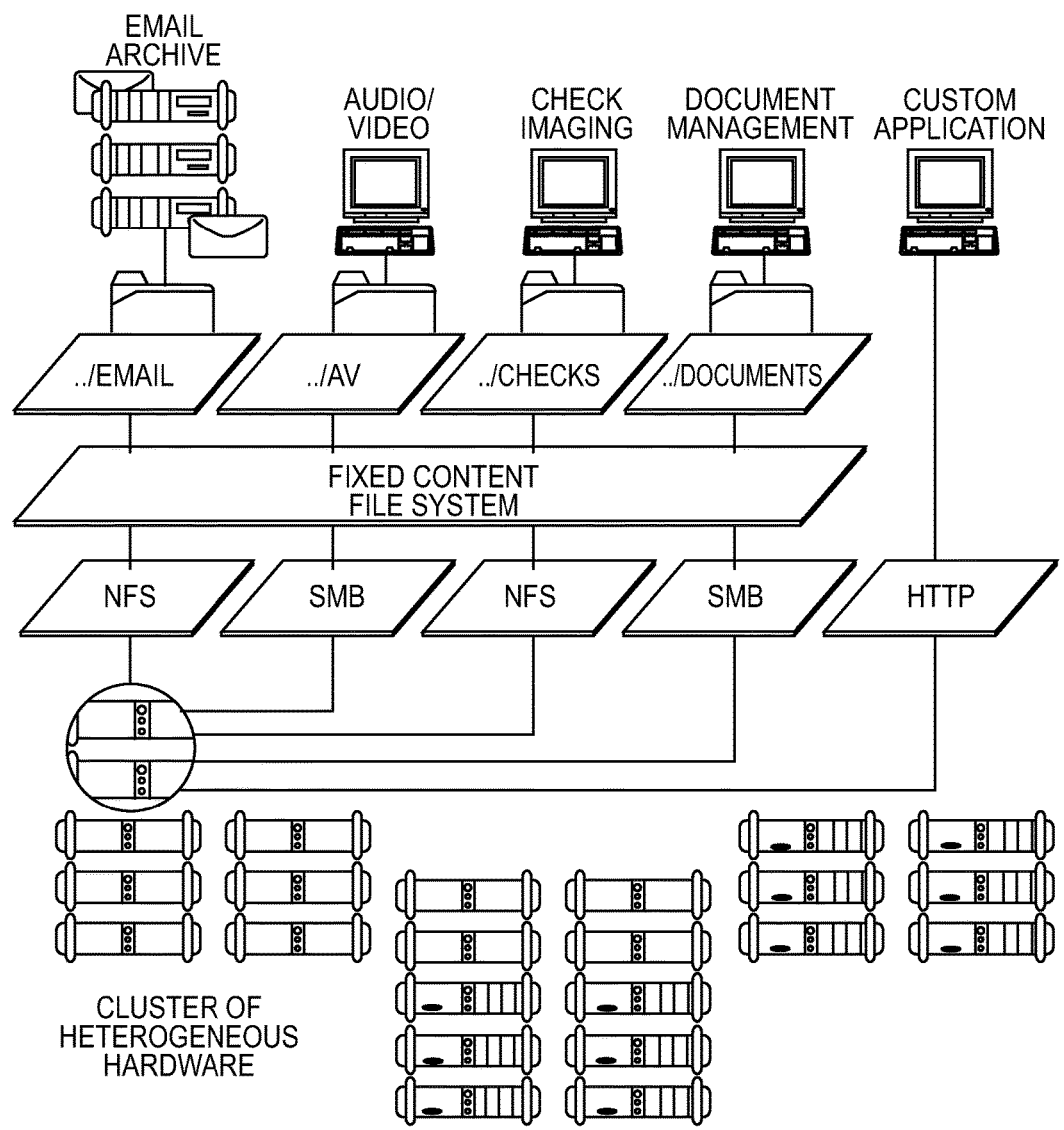
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for resource fencing or extended access security for multi-tenant data system.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
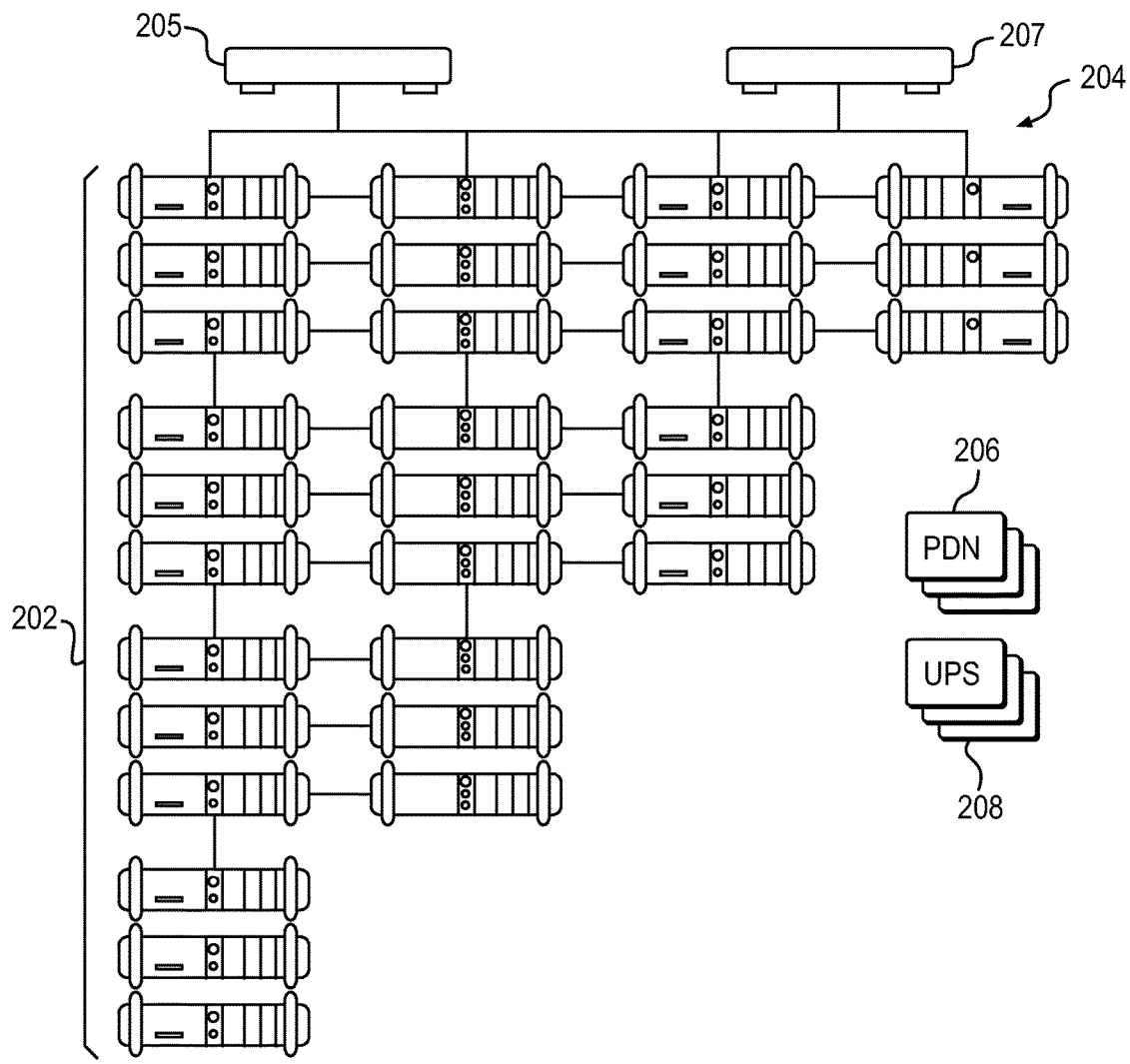
FIG. 2 is a simplified representation of a redundant array of independent nodes each of which is symmetric and supports an archive cluster application.

As described in commonly owned U.S. Pat. No. 7,155, 466, it is known in a RAIN-based archival system to incorporate a distributed software application executed on each node that captures, preserves, manages and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., CPU, suitable random access memory (RAM), one or more hard drives (e.g., standard IDE/SATA, SCSI, or the like), and two or more network interface (NIC) cards. A typical node is a 2 U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API (Application Program Interface), or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
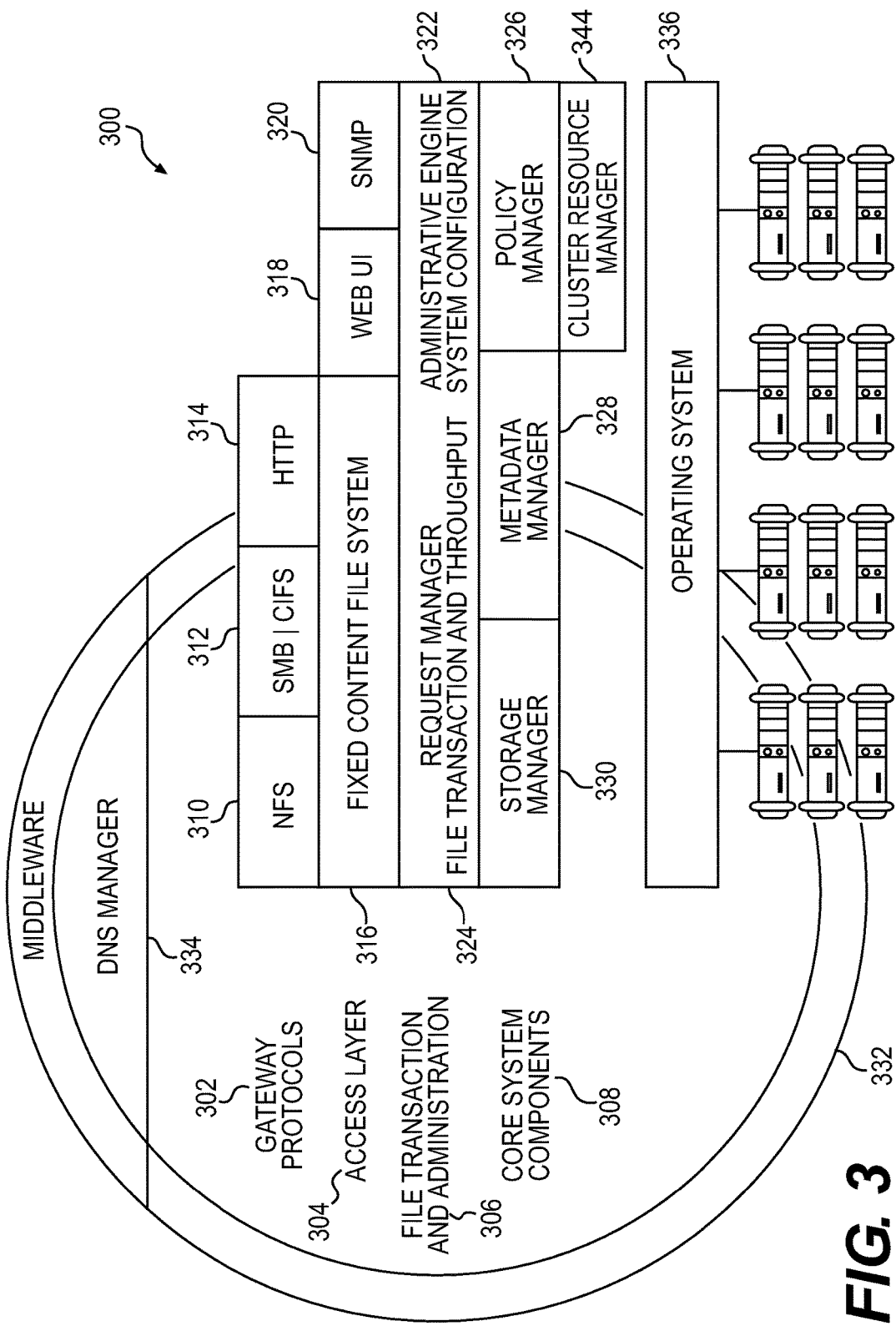
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application instance executes on a base operating system 336, such Linux, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A clusters primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication No. 2007/0189153 and U.S. Pat. No. 7,657,581, which are incorporated herein by reference.

II. Cluster Partitioning—Tenants & Namespaces

The following describes how an enterprise (or other entity, such as a service provider) can partition a cluster/system and use the cluster resources more effectively as the amount of user data to be stored increases. The following terminology applies to the subject matter. Data Account (DA) is an authenticated account that provides access to one or more namespaces. The account has a separate set of CRUD (create, read, update, and delete) privileges for each namespace that it can access. Namespace (NS) is a logical partition of the cluster. A namespace essentially serves as a collection of objects particular to at least one defined application. As will be described, each namespace has a private file system with respect to other namespaces. Moreover, access to one namespace does not grant a user access to another namespace. An archive may have an upper bound on the number of namespaces allowed on a single cluster (e.g., up to 10,000). Authenticated Namespace (ANS) is a namespace (preferably HTTP-only) that requires authenticated data access. Default Namespace (dNS) is a namespace for use with data that is ingested into the cluster in other than REST (Representational State Transfer), where REST is a lightweight protocol commonly used for exchanging structured data and type information on the Web. Further, even if an application uses the REST interface, if a namespace is not specified during authentication to the cluster, all data can be stored in the default namespace. Tenant is a grouping of namespace(s) and possibly other subtenants. Top-Level Tenant (TLT) is a tenant which has no parent tenant, e.g., an enterprise. Subtenant is a tenant whose parent is another tenant; e.g., the enterprise's financing department. Default Tenant is the top-level tenant that contains only the default namespace. Cluster (or system) is a physical archive instance, such as described above. See US2011/0106802, which is incorporated herein by reference in its entirety.

Figure 4:
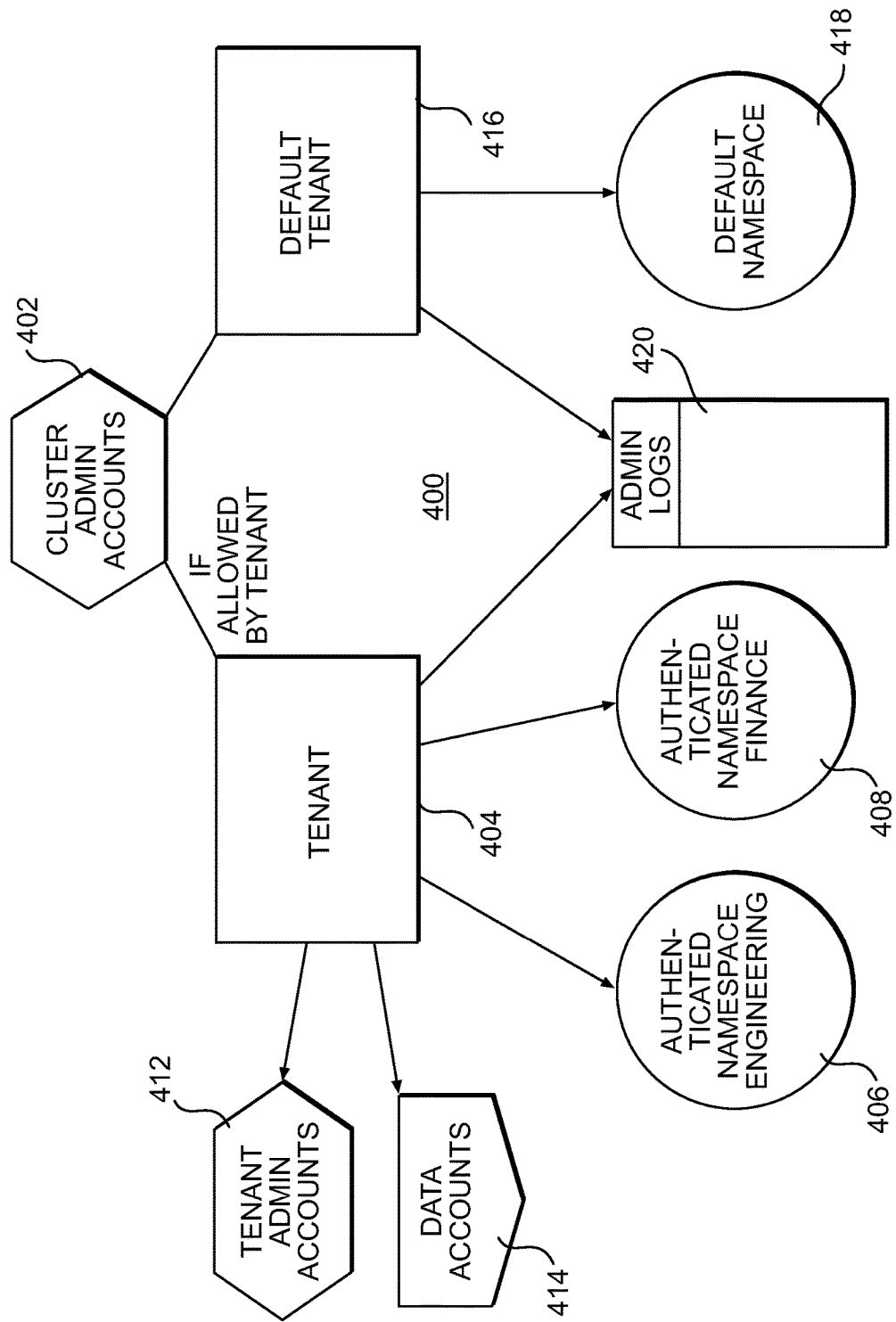
FIG. 4 illustrates an example of how a cluster is partitioned into tenants and namespaces.

When the cluster is freshly installed, it contains no tenants. Cluster administrators create top-level tenants and administrative accounts associated with those top-level tenants, and enable the default tenant and default namespace. FIG. 4 illustrates this basic concept. FIG. 4 shows a cluster instance 400, such as the system illustrated in FIGS. 2 and 3 and described above. A cluster administrator has an account 402. An appropriate administrator is given authority to create a top level tenant 404, and one or more namespaces for that TLT, such as first authenticated namespace 406 (for an engineering department) and a second authenticated namespace 408 (for a finance department). An appropriate administrator also sets up administrator accounts 412 and data accounts 414 for the TLT. In addition, an administrator can also enable a default tenant 416 having an associated default namespace 418. Although not shown, authorized administrators may also set up subtenants. The administrator also establishes administrative logs 420. Of course, the above configuration is merely exemplary, as the subject matter herein is not limited to any particular type of use case or tenant/namespace configuration.

At a macro level, all namespaces can be considered as the same or substantially the same entities with the same qualities and capabilities. Generally, and as will be seen, a namespace has a set of associated capabilities that may be enabled or disabled as determined by an appropriately credentialed administrator. A single namespace can host one or more applications, although preferably a namespace is associated with just one defined application (although this is not a limitation). A namespace typically has one or more of the following set of associated capabilities that a namespace administrator can choose to enable or disable for a given data account: read (r)—includes reading files, directory listings, and exists/HEAD operations; write (w); delete (d); purge (p)—allows one to purge all versions of a file; privileged (P)—allows for privileged delete and privileged purge; and search(es).

Using namespaces, and as illustrated generally in FIG. 4, an administrator can create multiple domains for a cluster, which domains differ based upon the perspective of the user/actor. These domains include, for example, the following: access application, cluster admin, TLT admin, subtenant admin, and replication. The domain of the access application is a given namespace. An authorized administrator (such as admin 402) has a view of the cluster as whole. As shown, the administrator 402 can create a top-level tenant and perform all of the administration for actions that have cluster scope. In certain situations, such as enterprise deployments, the tenant may grant appropriate administrators the ability to manage the tenant, in which case any cluster admin also will be able to function as a TLT admin. The TLT admin creates namespaces, data accounts, and subtenants. The TLT is able to modify some configuration settings, such as namespace quotas, or to enable versioning. The subtenant admin is able to create a namespace under a subtenant. The domain of replication is a set of TLTs defined by the cluster administrator while configuring replication between clusters.

One of ordinary skill in the art will appreciate that a tenant is a logical archive as viewed by an administrator. As shown in FIG. 4, a tenant may represent an organization or a department using a portion of a cluster. A tenant may be implemented as a hierarchy in that it can contain other tenants.

A tenant preferably has a set of attributes: namespaces, administrative accounts, data access accounts, permission mask, roll-up of state, name, and quotas. A tenant may contain zero or more namespaces. A tenant will have a set of administrative accounts (such as accounts 412) that enable users to monitor and update attributes of the tenant. The data access accounts are the set of accounts (such as accounts 414) which access namespace objects. A permission mask (r/w/d/p/P/s) is the set of permissions global to the tenant and that mask a namespace's permissions. The roll-up of state provides the metrics on all namespaces within the tenant. The name of the tenant is settable and changeable by an appropriate administrator. Tenant names within the same cluster must not collide. A top level tenant preferably is assigned a hard storage quota by the administrator. The appropriate admin can lower or raise that quota, and he or she can assign as much quota as desired. The TLT can also specify a soft quota, which is a given percentage of the hard quota. A tenant is able to divide its quota among one or more namespaces, but the total assigned quota may not exceed that of the tenant. For accounting purposes, preferably the quota will measure the rounded up size of an ingested file to the nearest block size. A soft quota is typically a predetermined percentage (e.g., 85%) of a hard quota, but this value may be configurable. Once the hard quota is exceeded, no further writes are allowed, although in-progress writes preferably are not blocked. It may be acceptable to have a delay between exceeding a quota and having future writes blocked. Preferably, quotas are replicated but cannot be changed. When a replica becomes writable, the quota is enforced there as well.

A tenant administrator also has a set of roles that include one or more of the following: a monitor role, an administrator role, a security role, and a compliance role. A monitor role is a read-only version of an administrator role. The administrator role is the primary role associated with a tenant. As described and illustrated above, this role allows an admin user to create namespaces under the current tenant, and it provides a view of all namespaces within this tenant (and associated statistics such as file counts, space available, space used, etc.). The administrator also can view tenant and namespace logs, and he or she can view/update tenant and namespace configuration. The security role gives a user the ability to create/modify/delete new administrative users. A user with the security role can add and delete roles from other tenant-level administrative accounts. When the tenant is first created, preferably there is one administrative user associated with the tenant, and this user account has just the security role. The compliance role enables privileged delete and retention class functions (as defined below).

A namespace is a logical archive as viewed by an application. According to the subject matter herein, a particular namespace is distinct from a different namespace, and access to one namespace does not grant a user access to another namespace. Preferably, administration of a namespace is performed at the owning tenant level. Moreover, preferably a namespace may only be deleted if a count of objects associated with that namespace is zero. A namespace preferably also has the following attributes: permission mask, initial settings, other settings, display name, quota, logs, and stats. As noted above, the permission mask (r/w/d/p/P/s) is the set of settings global to the namespace and which mask an account's permissions. The initial settings identify a data protection level (DPL), a hashing scheme, and the like, that preferably remain persistent. The other settings refer to settings (such as retention, shred, versioning, indexing, and the like) that can be set on the namespace and then later changed. The display name is a name or other identifier for the namespace. The quota is either hard (in GB) or soft (in percent). The logs attribute identifies the system events related to the namespace that will be logged. The stats attribute identifies the statistics that are generated from namespace-related data, such as capacity, number of objects, and the like.

Preferably, tenant names and namespace names are human readable identifiers in the various administrative user interfaces (UIs). Preferably, these names also are used in hostnames to specify the namespace of a data access request, the tenant which an administrator is administrating, and the scope over which a search should be confined. The namespace name is useful because a tenant may have more than one namespace associated with it. Preferably, object access over HTTP uses a hostname in the form of:

<namespace-name>.<tenant-name>.<cluster-domain-suffix>

These names comply with conventional domain name system (DNS) standards. As noted above, tenant names on a cluster must not collide.

III. Resource Fencing for Multi-Tenant Data Systems

Figure 5:
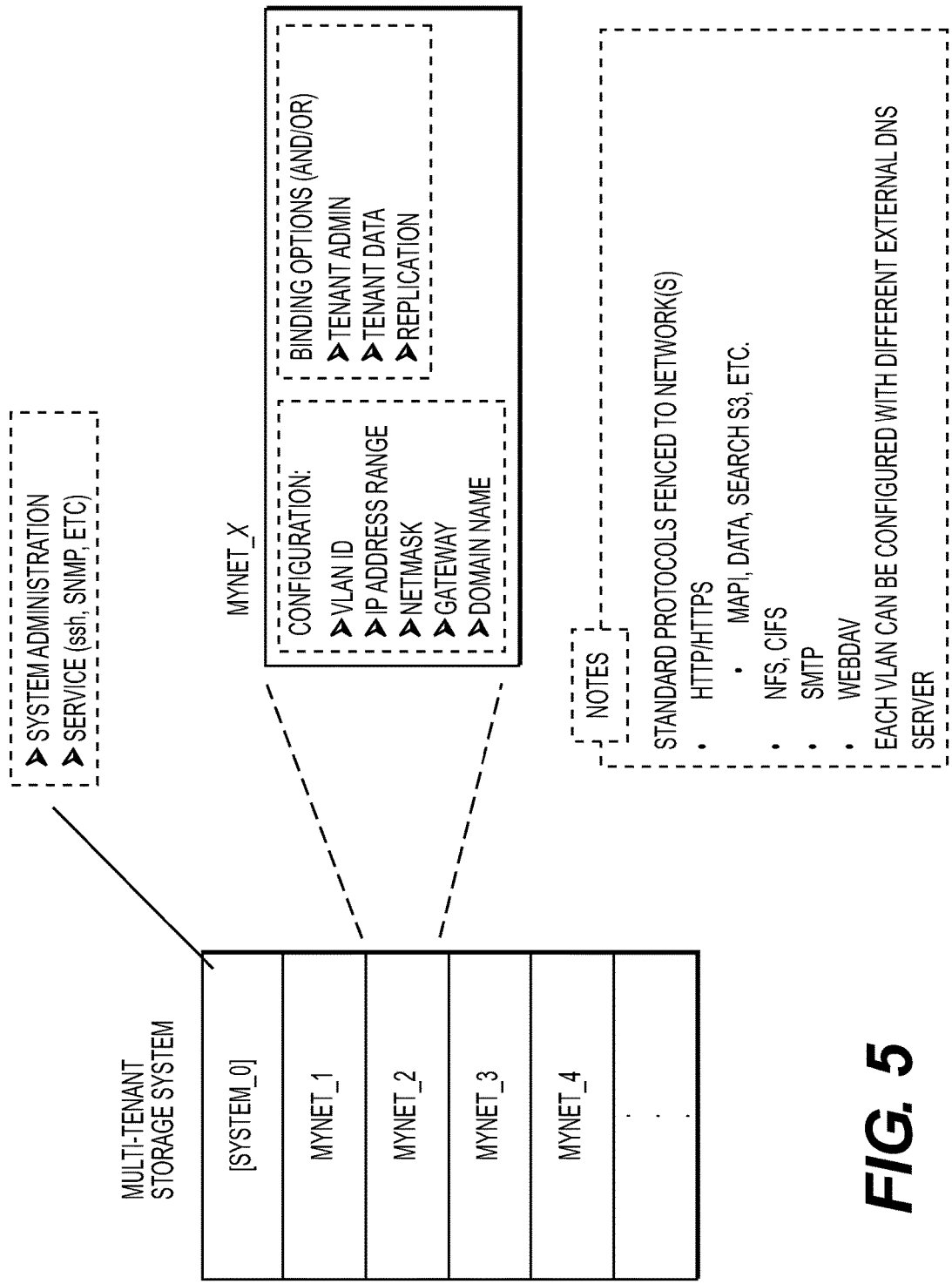
FIG. 5 shows an example of a multi-tenant data system (MTDS).

FIG. 5 shows an example of a multi-tenant data system (MTDS) or multi-tenant storage system. The system has system administration and service (ssh, SNMP, etc.). This example shows a network configuration that can be configured on a content platform. Then these networks can be assigned bindings tied to any number of tenant admin or data, and/or to replication traffic. The network configuration includes VLAN ID, IP address range, netmask, gateway, and domain name, and the binding options (and/or) include tenant admin, tenant data, and replication. Standard protocols fenced to network(s) include HTTP/HTTPS, NFS and CIFS, SMTP, and WebDAV. Each VLAN can be configured with a different external DNS server.

Figure 6:
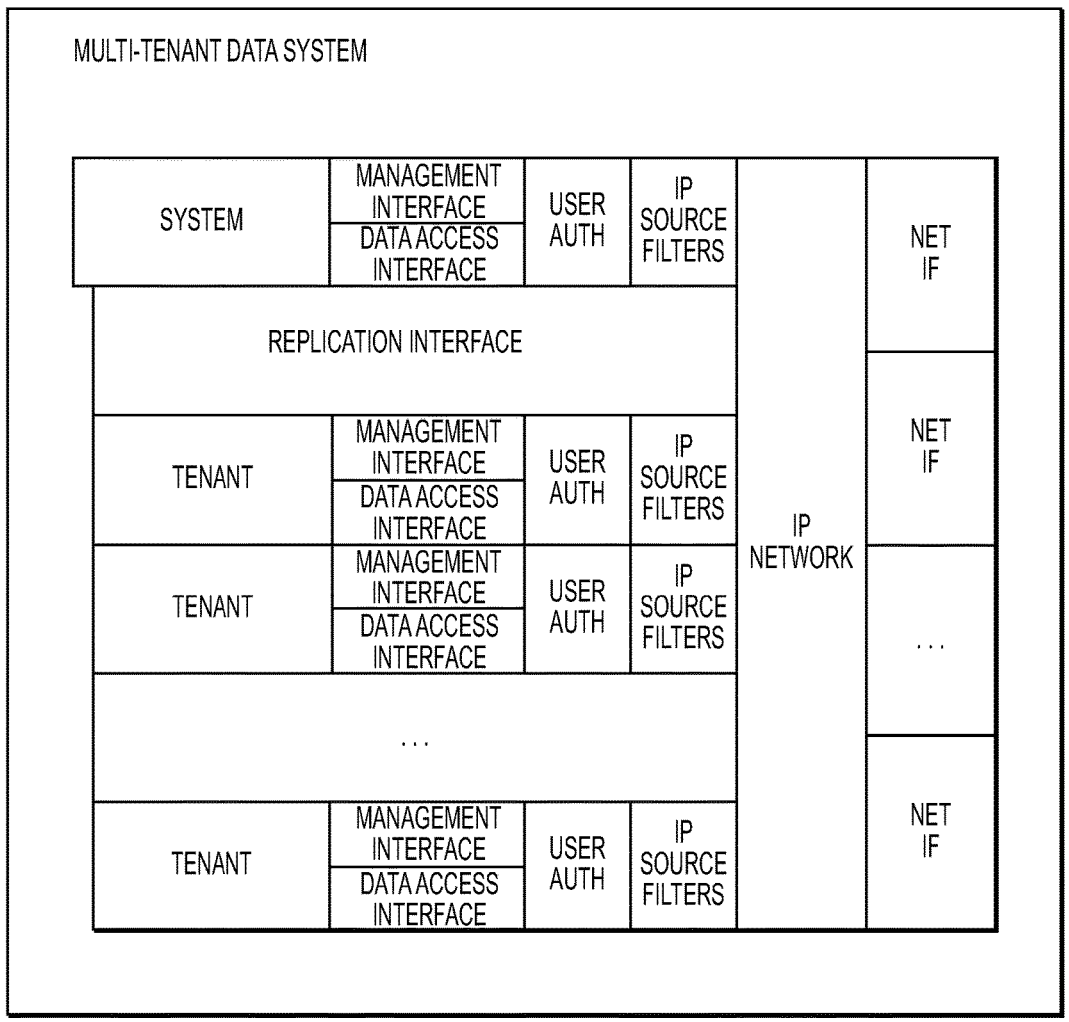
FIG. 6 shows a prior network to resource mapping with a single IP network shared among all features of the system.

The present invention of resource fencing or extended access security for MTDS is not a firewall solution. Rather, each system management and data access application provides application-appropriate methods to determine if the network address at which the service has been requested is in the IP network bound to the application. Heretofore, the MTDS bonded its physical LAN interfaces on a single IP network shared among all features of the system. FIG. 6 shows a prior network to resource mapping with a single IP network shared among all features of the system. Management and application interfaces required application-appropriate authentication. Managers of the system could, at their discretion, apply IP source address filtering on a per-application basis.

Figure 7:
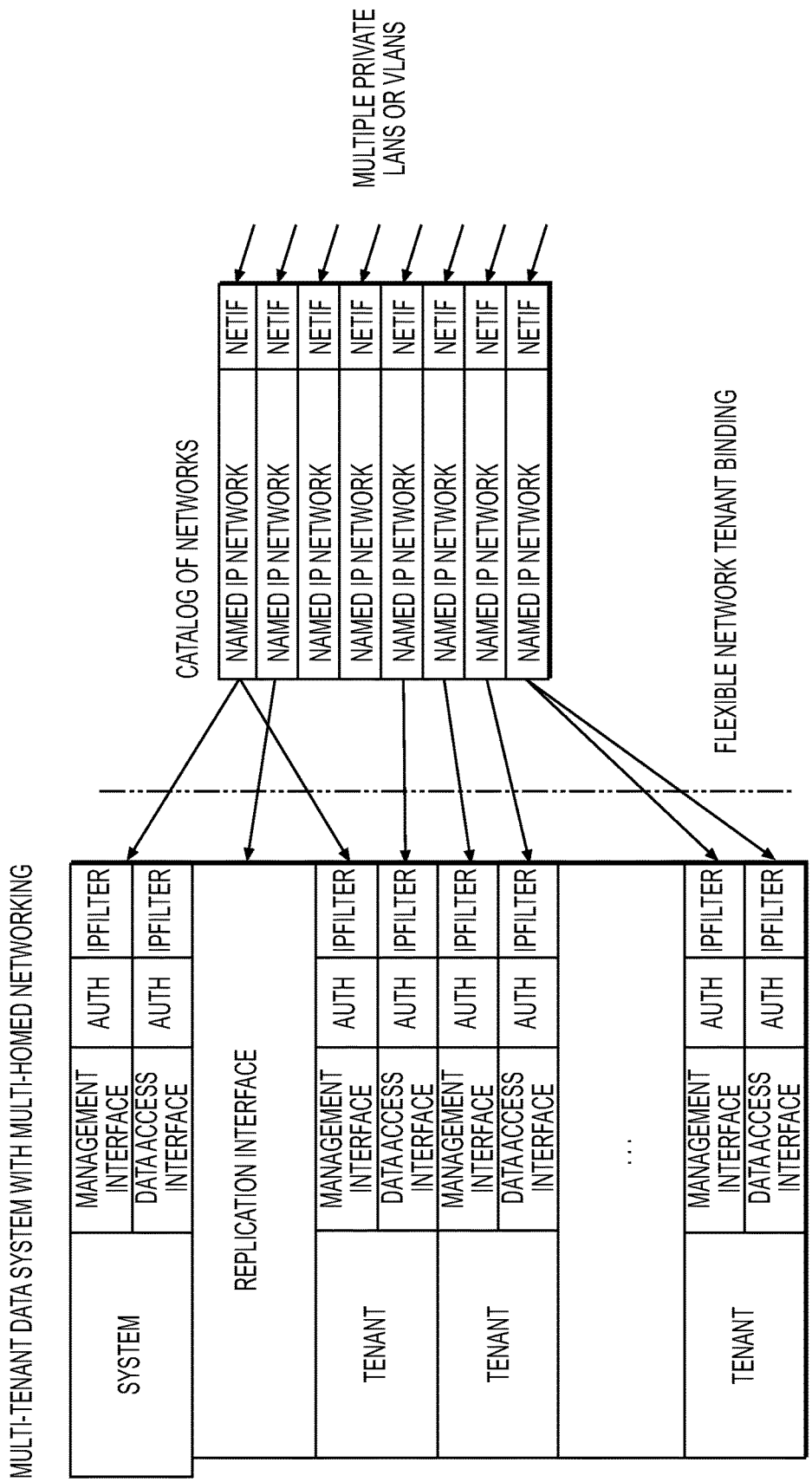
FIG. 7 shows an example of a network of resource mapping for a multi-tenant data system with multi-homed networking according to an embodiment of the present invention.

FIG. 7 shows an example of a network of resource mapping for a multi-tenant data system with multi-homed networking according to an embodiment of the present invention. The embodiment provides a plurality of network interfaces (NetIF) to be provisioned for the system, each with a private IP network with a name (Named IP Network) in a Catalog of Networks (mapping of one Named IP Network to one NetIF only). The system management, replication, the tenant management, and data (end-user) access interfaces for the system are bound to a specific network upon creation. Multiple system capabilities can share a network (mapping/binding of one Named IP Network to one or more system capabilities in FIG. 7). Each capability is connected to one and only one network (there is no mapping/binding of one system capability to multiple Named IP Networks in FIG. 7). The effect of this networking architecture is that every management or application resource: (1) is bound to a specific Tenant, the System, or the dedicated inbound Replication Interface, and (2) has a destination IP address because of the binding of the interface to a specific network. A catalog of networks is used to provide end point security by destination (e.g., filtering by destination IP address).

Figure 8:
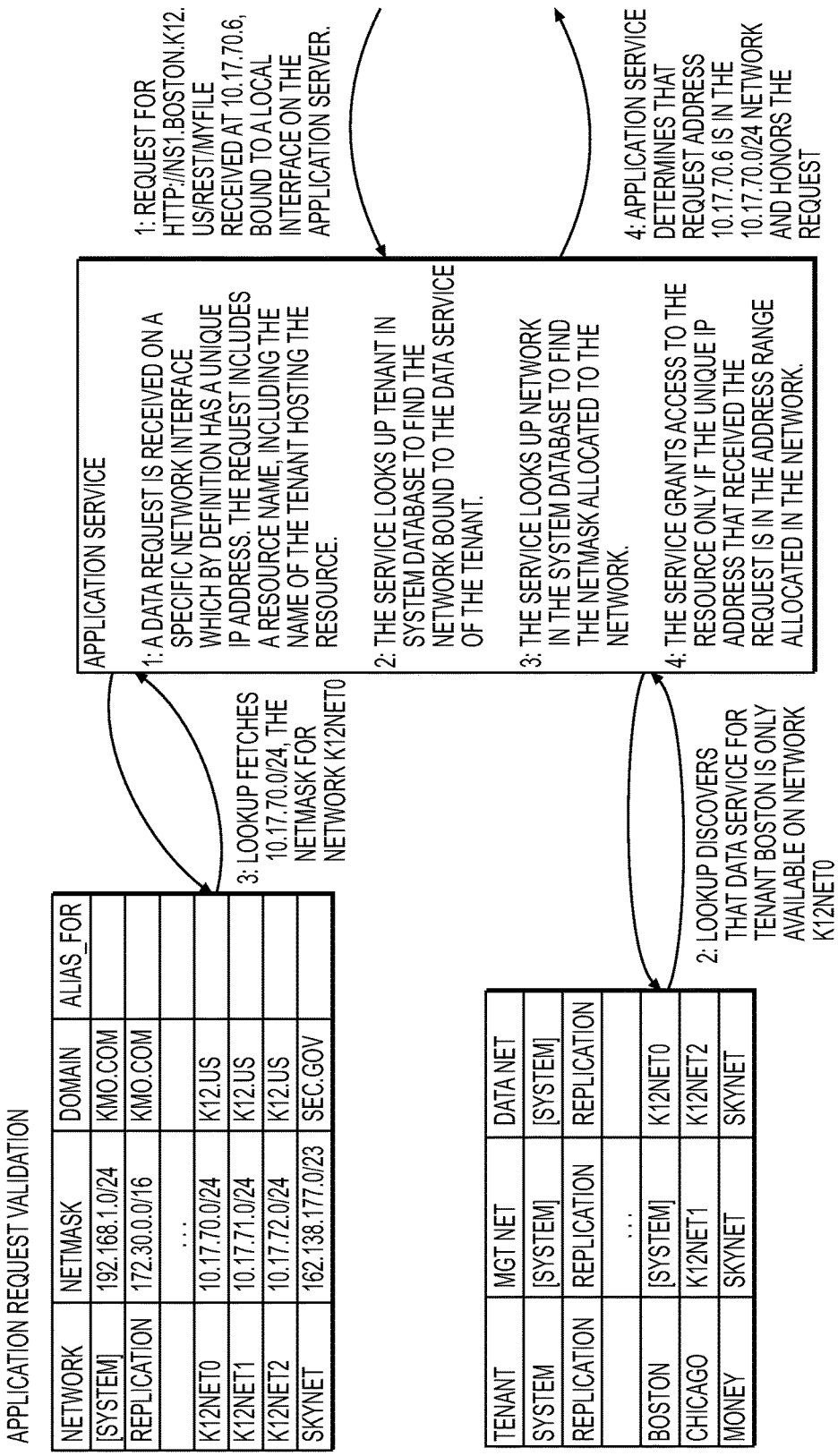
FIG. 8 shows an example of a diagram illustrating an application request method.
Figure 9:
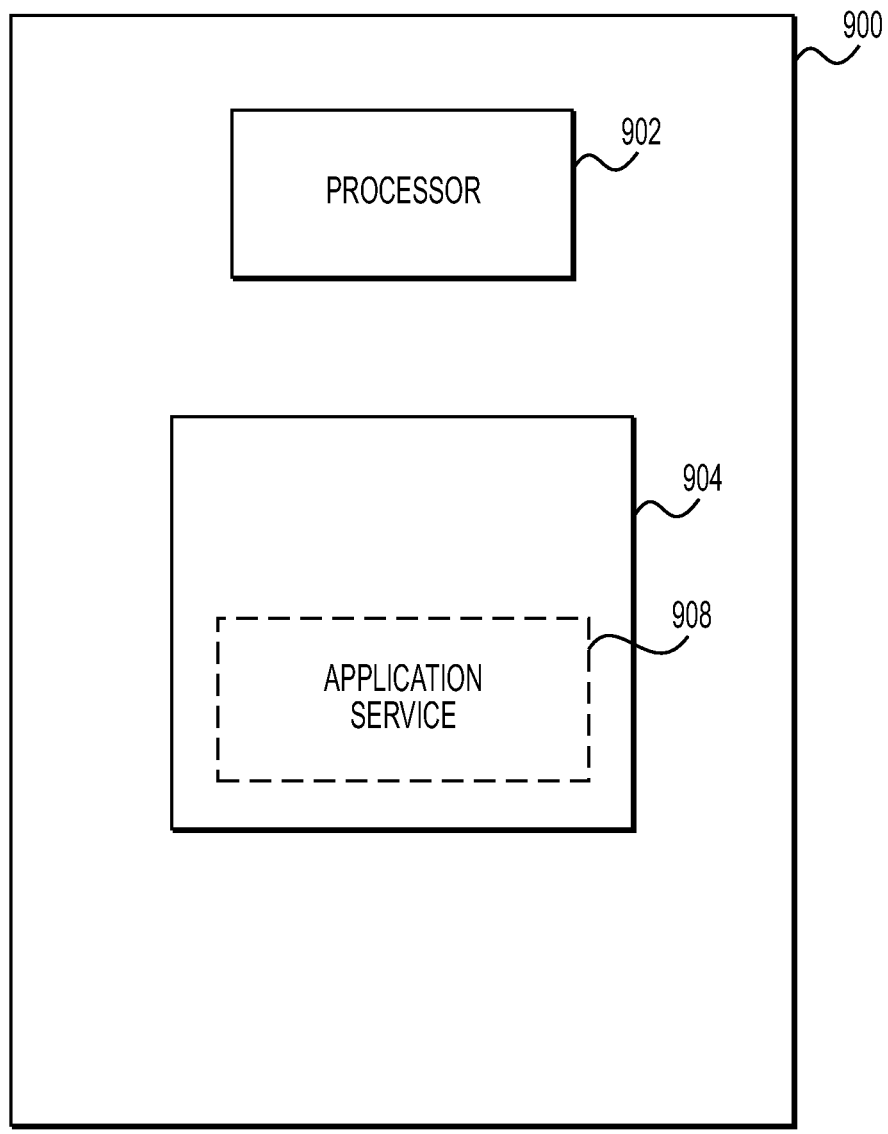
FIG. 9 shows an example of an apparatus for implementing the application service.

FIG. 8 shows an example of a diagram illustrating an application request method. Using this method, each application can validate that the resource being requested is in fact bound to the network at which it is being requested. First, the application service receives a request on a specific network interface which by definition has a unique IP address. The request has a resource name, including the name of the tenant hosting the resource. In this example, a request for http://ns1.boston.k12.us/rest/myfile is received at 10.17.70.6, bound to a local interface on the application server. Second, the application service looks up tenant in the system database to find the network bound to the data service of the tenant. In this example, the lookup fetches 10.17.70.0/24, which is the netmask for network k12net0. Third, the application service looks up network in the system database to find the netmask allocated to the network. In this example, the lookup discovers that data service for tenant boston is only available on network k12net0. Fourth, the application service grants access to the resource only if the unique IP address that received the request is in the address range allocated to the network. In this example, the application service determines that the request address 10.17.70.6 is in the 10.17.70.0/24 network and honors the request. The application service may be implemented in software, hardware, or the like and be executed by a processor or controller in the MTDS or some other storage system or a management system. FIG. 9 shows an example of an apparatus 900 having a processor or controller 902 and a memory 904 for implementing the application service. In one embodiment, the application service 908 shown in phantom is stored in the memory 904 to be executed by the processor 902.

Figure 10:
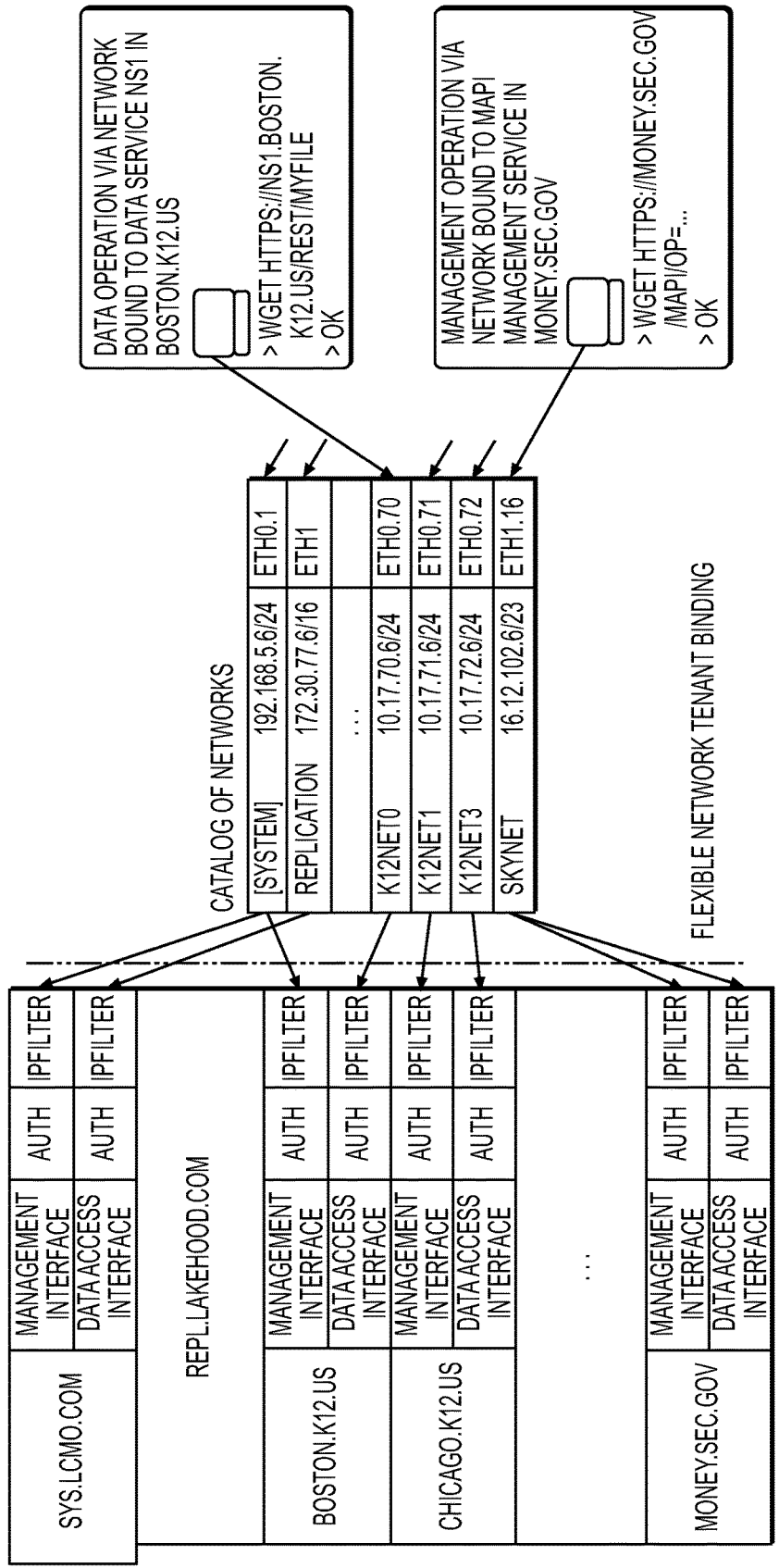
FIG. 10 shows an example of a diagram illustrating accepted resource requests.

Users presenting valid credentials and asking for a resource at the currently configured address for that resource are granted access. FIG. 10 shows an example of a diagram illustrating accepted resource requests. Operations are honored if received at a properly configured network interface. The first example is data operation via network bound to data service ns1 in boston.k12.us, which is honored when received at the properly configured network interface eth0.70 of the network k12net0 10.17.70.6/24 that is mapped to the data interface of the tenant boston.k12.us. The second example is management operation via network bound to map1 management service in money.sec.gov, which is honored when received at the properly configured network interface eth1.16 of the network skynet 16.12.102.6/23 that is mapped to the management interface (as well as the data access interface) of the tenant money.sec.gov.

Figure 11:
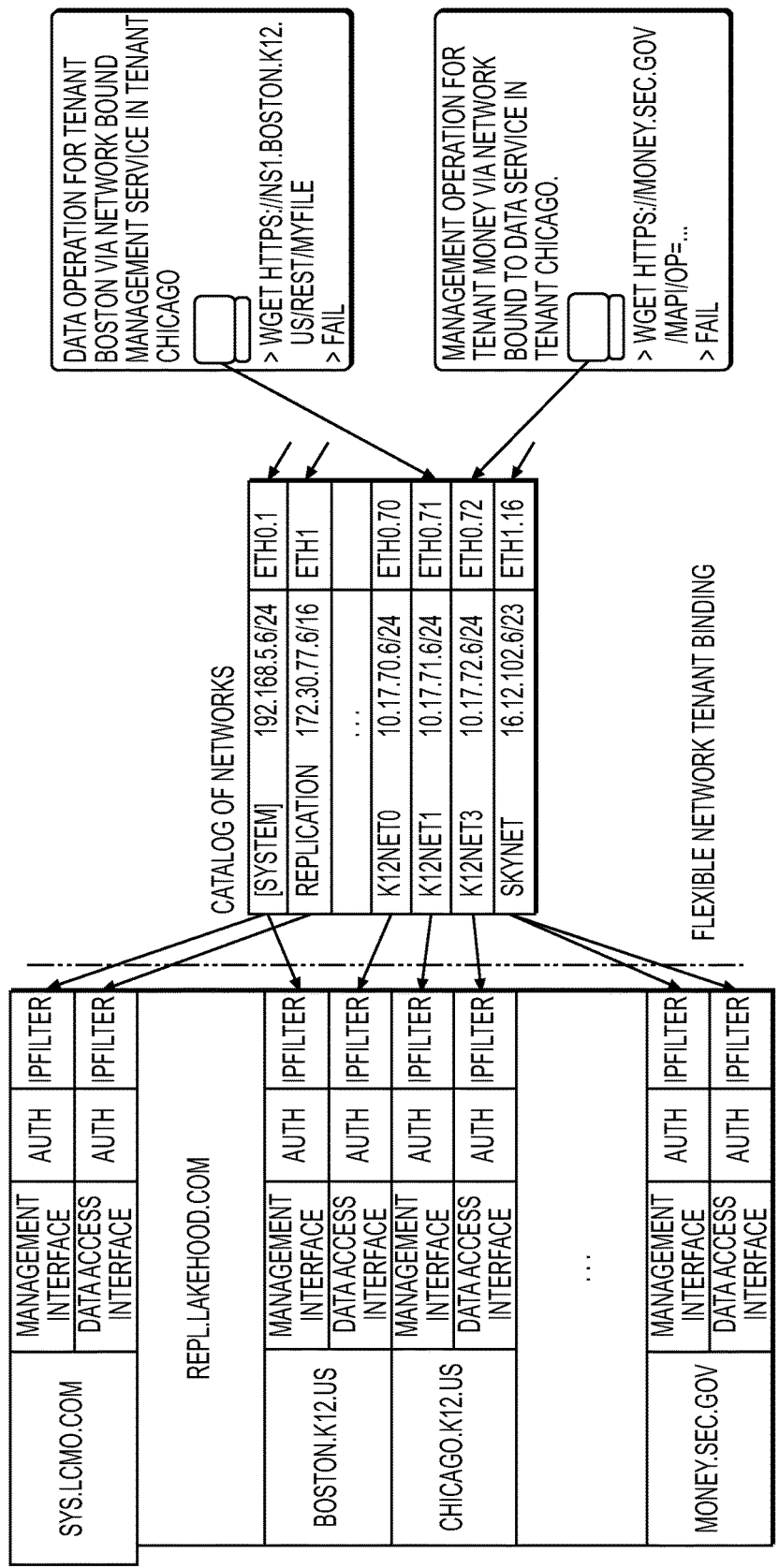
FIG. 11 shows an example of a diagram illustrating rejected resource requests.

Users presenting valid credentials but asking for a resource at an address that is outside the IP network provisioned for the resource are denied access. FIG. 11 shows an example of a diagram illustrating rejected resource requests. Operations are refused if received at the wrong network interface. The first example is data operation for tenant boston via network bound to management service in tenant chicago, which fails because it is received at the wrong network interface eth0.71 of the network k12net1 10.17.71.6/24 that is mapped to the management interface of the tenant chicago.k12.us. The second example is management operation for tenant money via network bound to data service in tenant chicago, which fails because it is received at the wrong network interface eth072 of the network k12net3 10.17.71.6/24 that is mapped to the management interface of the tenant chicago.k12.us.

Such a data system may have one or more replica data systems at different sites. Each of these replicas are expected to act as a replacement system in the event of catastrophic failure of the primary system or its environment. For any such replica to serve as a replacement, the enhanced access security would require that it has an identical network topology as the primary site. For a number of reasons this is not practical. For instance, replica sites may be sparsely provisioned on the assumption that their role is for disaster management only. The replica site may be in itself a primary data system for a different set of tenants which have provisioning priority over any tenants being replicated to the site from elsewhere. Because the primary and replica sites may have differing topologies, failover to the replica may render some of the tenants inaccessible because the enhanced access security may not find appropriate network mappings in the remote site network catalog.

Figure 12:
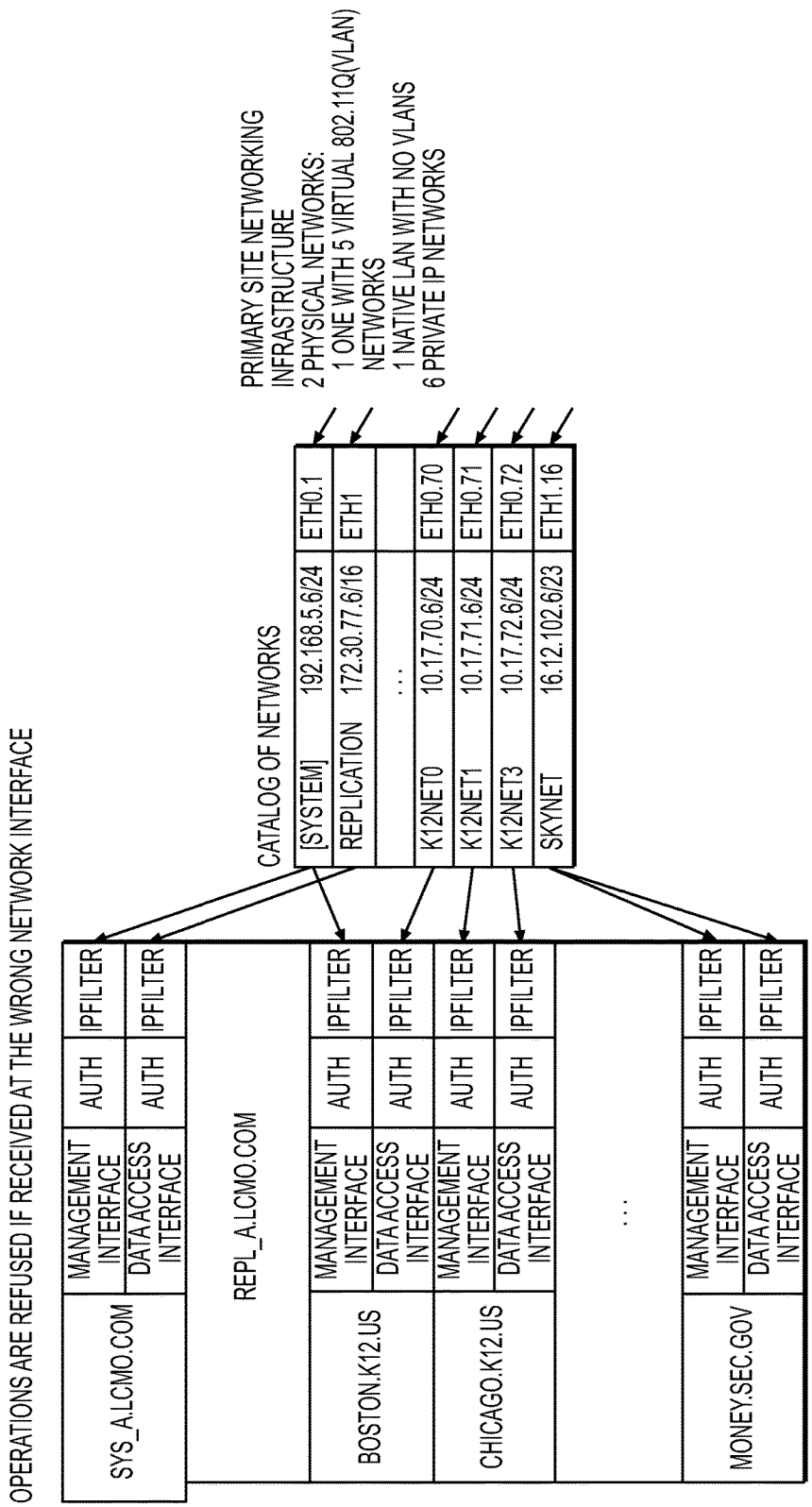
FIG. 12 shows an example of a primary site.
Figure 13:
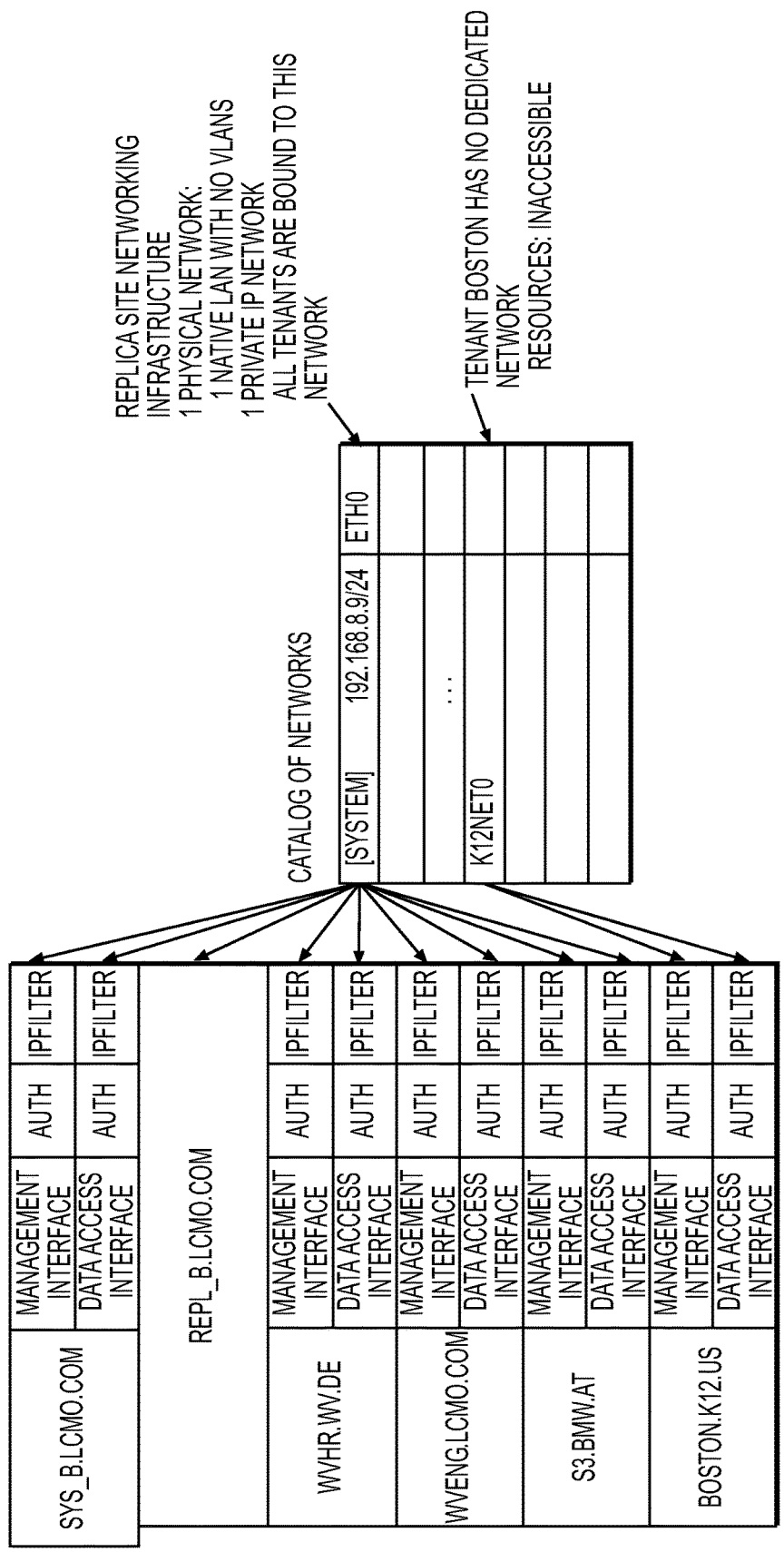
FIG. 13 shows an example of a replica site, in which the tenant boston is being replicated.

FIG. 12 shows an example of a primary site. FIG. 13 shows an example of a replica site, in which the tenant boston is being replicated. The primary site and the replica site have different topologies. The primary site networking infrastructure has two physical networks (one with five virtual 802.11q (VLAN) networks and one native LAN with no VLANs) and six private IP networks. The replica site networking infrastructure has one physical network (native LAN with no VLANs) and one private IP network (all tenants are bound to this network). Tenant boston has no dedicated network resources and is thus inaccessible. Such a topology mismatch, in combination with the enhanced access restriction, would make resources on the replica unavailable to legitimate users because of the lack of appropriate networking endpoints on the replica.

Network Alias

The invention includes a mechanism to allow the manager of the replica to mimic the private IP catalog of the primary site by the use of a network alias. Because networks in the network catalog are bound to their resources by name, the alias allows the application-appropriate access restrictions to find a suitable binding in the network catalog.

Figure 14:
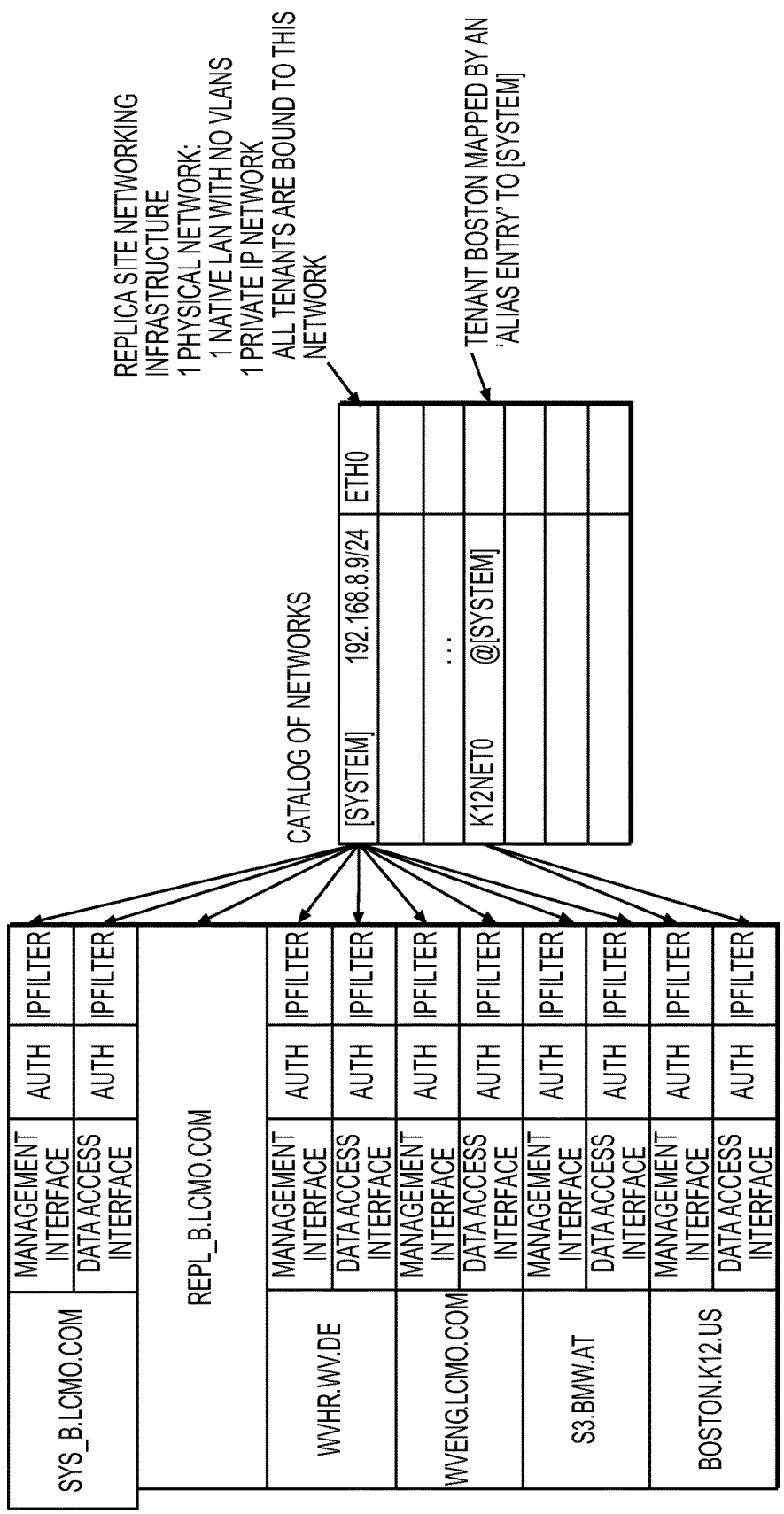
FIG. 14 shows an example of an alias entry that allows topological impedance matching for the replica site of FIG. 13.

FIG. 14 shows an example of an alias entry that allows topological impedance matching for the replica site of FIG. 13. While tenant boston has no dedicated network resources in FIG. 13, tenant boston is mapped by an alias entry to network [system] in FIG. 14 to render is accessible (k12net0 @[system]).

Figure 15:
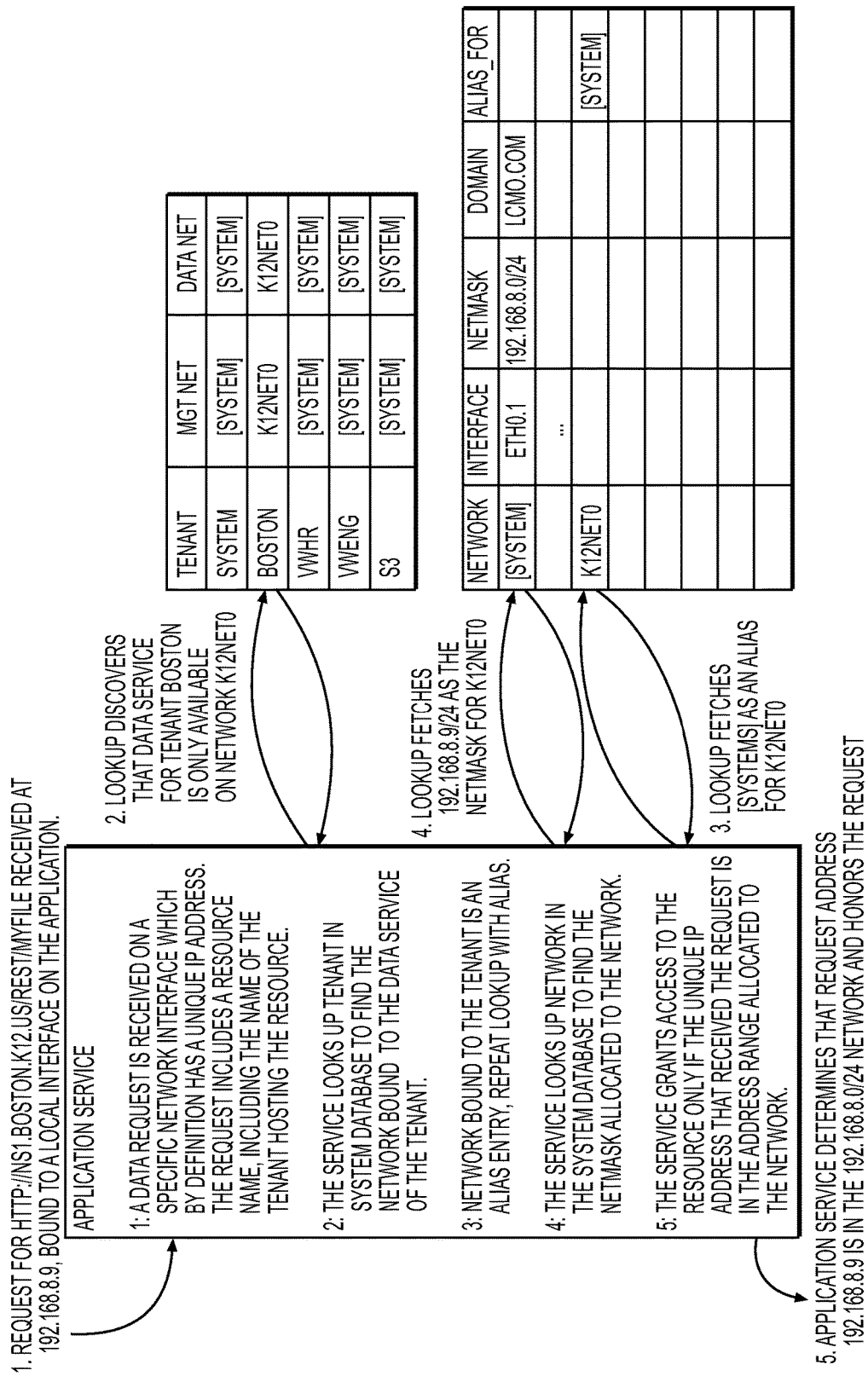
FIG. 15 shows an example of lookups which now succeed by way of alias lookup.

FIG. 15 shows an example of lookups which now succeed by way of alias lookup. First, the application service receives a data request on a specific network interface which by definition has a unique IP address. The request has a resource name, including the name of the tenant hosting the resource. In this example, a request for http://ns1.boston.k12.us/rest/myfile is received at 192.168.8.9, bound to a local interface on the application server. Second, the application service looks up tenant in the system database to find the network bound to the data service of the tenant. In this example, the lookup discovers that data service for tenant boston is only available on network k12net0. Third, the network bound to the tenant is an alias entry, and the application service repeats the lookup with the alias. In this example, the lookup fetches [system] as an alias for k12net0. Fourth, the application service looks up network in the system database to find the netmask allocated to the network. In this example, the lookup fetches 192.168.8.9/24 as the netmask for k12net0. Fifth, the application service grants access to the resource only if the unique IP address that received the request is in the address range allocated to the network. In this example, the application service determines that the request address 192.168.8.9 is in the 192.168.9.0/24 network and honors the request.

The invention is a key enabler for enhanced data access security by allowing site managers to multi-home the system and provide inter-tenant barriers through networking technology.

Of course, the system configurations illustrated in FIGS. 1 and 4 are purely exemplary of systems including content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for providing a resource fencing or extended access security for multi-tenant data system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In a storage system having a plurality of nodes, the nodes being grouped into a plurality of cluster systems each having multiple nodes, each cluster system being logically partitioned into a plurality of namespaces, each namespace including a collection of data objects, each cluster system having multiple tenants, each tenant being a grouping of namespaces, each cluster system having a plurality of capabilities, at least some of the capabilities being bound to the tenants, a node in the cluster system comprising:

a memory, and a controller operable to bind each capability to one of a plurality of IP networks so that each capability is bound to only one of the IP networks and has a destination IP address of the IP network to which the capability is bound;

wherein it is permissible for one or more capabilities to be bound to the same IP network;

wherein each IP network has one corresponding network interface;

wherein each capability is a resource that is bound to one of (i) the cluster system or (ii) a replication interface of the cluster system or (iii) one of the tenants of the cluster system; and wherein the controller is operable, in response to a request for a capability received via the corresponding network interface of one of the IP networks, to:

find an IP network which is bound to the capability being requested by the request and determine whether an IP address of the IP network at which the request is received is in an address range allocated to the found IP network;

if the IP address of the IP network at which the request is received is in an address range allocated to the found IP network, grant access by the request to the requested capability; and if the IP address of the IP network at which the request is received is not in an address range allocated to the found IP network, deny access by the request to the requested capability.

2. The node according to claim 1, wherein the IP networks include a plurality of physical and virtual LAN segments.

3. The node according to claim 1, wherein the capabilities comprise one or more of:

management resource of the cluster system;

data resource of the cluster system;
replication resource;
management resources of the tenants; or
data resources of the tenants.

4. The node according to claim 1, wherein the controller is operable, in response to a request for a capability received via the corresponding network interface of one of the IP networks, to:
determine whether the capability being requested by the request is bound to a tenant and, if yes, find an IP network which is bound to the capability being requested by the request and determine whether the found IP network has an IP network alias entry;
if it is determined that the found IP network does not have an IP network alias entry, determine whether an IP address of the IP network at which the request is received is in an address range allocated to the found IP network and, if yes, grant access by the request to the requested capability and, if no, deny access by the request to the requested capability; and
if it is determined that the found IP network has an alias entry, look up an alias IP network based on the IP network alias entry, and determine whether an IP address of the IP network at which the request is received is in an address range allocated to the alias IP network and, if yes, grant access by the request to the requested capability and, if no, deny access by the request to the requested capability.

5. A method for managing access to capabilities, in a storage system having a plurality of independent nodes, the nodes being grouped into a plurality of cluster systems each having multiple nodes, each cluster system being logically partitioned into a plurality of namespaces, each namespace including a collection of data objects, each cluster system having multiple tenants, each tenant being a grouping of namespaces, each cluster system having a plurality of capabilities, at least some of the capabilities being bound to the tenants, a node in the cluster system including a memory and a controller, the method comprising:
binding each capability to one of a plurality of IP networks so that each capability is bound to only one of the IP networks and have a destination IP address of the IP network to which the capability is bound; and
in response to a request for a capability received via the corresponding network interface of one of the IP networks:
finding an IP network which is bound to the capability being requested by the request and determining whether an IP address of the IP network at which the request is received is in an address range allocated to the found IP network;
if the IP address of the IP network at which the request is received is in an address range allocated to the found IP network, granting access by the request to the requested capability; and
if the IP address of the IP network at which the request is received is not in an address range allocated to the found IP network, denying access by the request to the requested capability;
wherein it is permissible for one or more capabilities to be bound to the same IP network;
wherein each IP network has one corresponding network interface; and
wherein each capability is a resource that is bound to one of (i) the cluster system or (ii) a replication interface of the cluster system or (iii) one of the tenants of the cluster system.

6. The method according to claim 5,
wherein the IP networks include a plurality of physical and virtual LAN segments.

7. The method according to claim 5, wherein the capabilities comprise one or more of:
management resource of the cluster system;
data resource of the cluster system;
replication resource;
management resources of the tenants; or
data resources of the tenants.

8. The method according to claim 5, further comprising, in response to a request for a capability received via the corresponding network interface of one of the IP networks:
determining whether the capability being requested by the request is bound to a tenant and, if yes, finding an IP network which is bound to the capability being requested by the request and determining whether the found IP network has an IP network alias entry;
if it is determined that the found IP network does not have an IP network alias entry, determining whether an IP address of the IP network at which the request is received is in an address range allocated to the found IP network and, if yes, granting access by the request to the requested capability and, if no, denying access by the request to the requested capability; and
if it is determined that the found IP network has an alias entry, looking up an alias IP network based on the IP network alias entry, and determining whether an IP address of the IP network at which the request is received is in an address range allocated to the alias IP network and, if yes, granting access by the request to the requested capability and, if no, denying access by the request to the requested capability.

9. The method according to claim 5, further comprising:
for a capability which is bound to a tenant which has no dedicated network resources and is inaccessible, finding an IP network which is bound to the capability and assigning an IP network alias entry of an alias IP network to the found IP network so as to map the capability via the IP network alias entry to the alias IP network;
wherein the alias IP network provides network access to the capability which is bound to the tenant.

* * * * *